Jan. 6, 1970   G. M. LANFRANCONI   3,487,506
EXTRUDER FOR SHEATHING CABLE CORES
Filed March 26, 1968
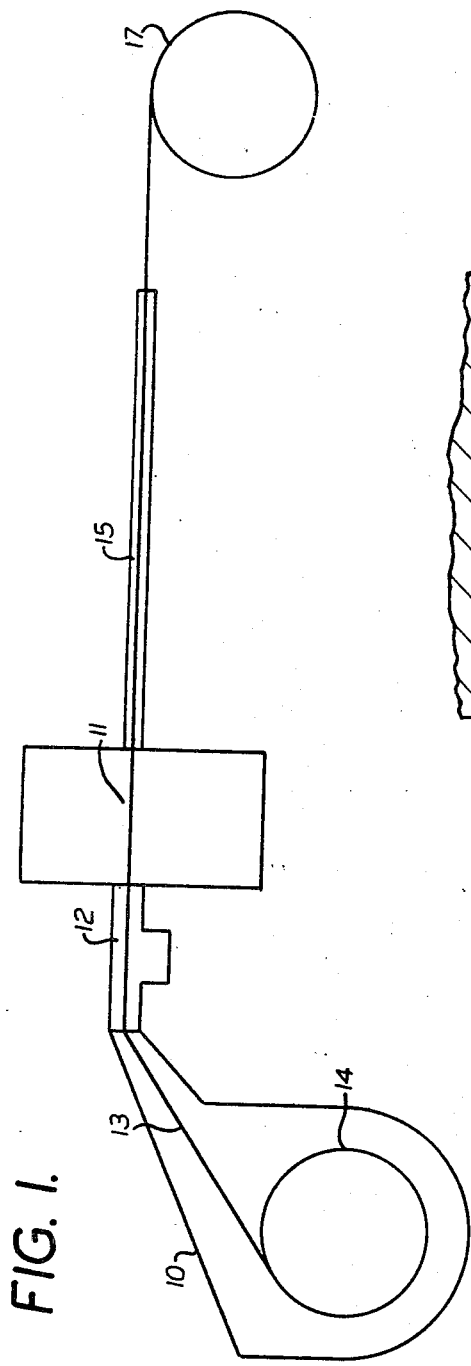
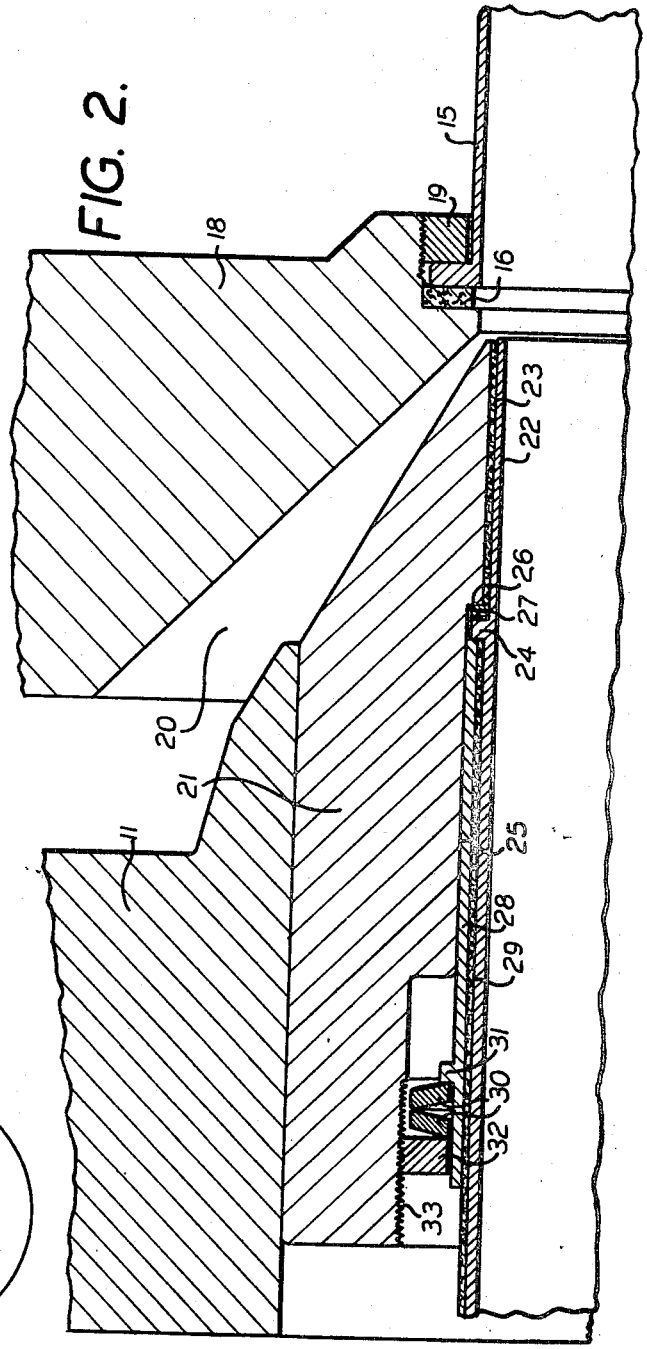
INVENTOR
GIAN MARIO LANFRANCONI
BY
Ward, McElhannon, Brooks & Fitzpatrick
ATTORNEYS.

United States Patent Office 3,487,506
Patented Jan. 6, 1970

3,487,506
EXTRUDER FOR SHEATHING CABLE CORES
Gian Mario Lanfranconi, Milan, Italy, assignor to Pirelli Societa per Azioni, Milan, Italy, a corporation of Italy
Filed Mar. 26, 1968, Ser. No. 716,123
Claims priority, application Italy, Apr. 24, 1967, 15,331A/67
Int. Cl. B29f 3/10
U.S. Cl. 18—13                    7 Claims

ABSTRACT OF THE DISCLOSURE

The through bore of the inner die for an extruder for sheathing cable is formed with a shoulder facing its inlet end. A metal tube concentric with the bore is separated radially therefrom by a layer of thermal insulation extending from the shoulder to the outlet end of the die. A packing ring of asbestos, faced with copper rings is compressed between the shoulder in the die bore and a flange on the metal tube. A second metal tube surrounds the first tube, radially spaced therefrom by a layer of thermal insulation, with one end bearing against the flange on the first tube. A ring threadedly engaged in the die bore urges a compression spring against a flange on the second tube.

---

The present invention relates to an improved extruder for sheathing electric cables which are impregnated with insulating liquid and, in particular, oil-filled cables.

The sheathing of electric cables with an extruded protective sheath, for example, of lead, aluminum, thermoplastic resin or the like, which has the necessary mechanical characteristics and the requisite impermeability, involves some difficulties, particularly in the case of cables impregnated with an insulating liquid. Such difficulties are due to the need for maintaining the impregnating liquid at a sufficiently low temperature while avoiding cooling of the inner die member of the extruder by said liquid which cooling would affect adversely the uniformity and the mechanical characteristics of the sheath.

To eliminate the aforesaid difficulties it has previously been proposed that an insulating tube be inserted in the bore of the inner die member, between the latter and the core to be sheathed. The prior arrangement contemplates that the insulating tube at the terminal portion adjacent the rear or inlet part of the extruder be cylindrical and double-walled in order to allow circulation of cooling fluid. The other terminal portion of the tube is provided with a tapered part, of frusto-conical form, which presses against a surface, also of frusto-conical form, provided in the bore of the inner die member. A layer of heat-insulating material consisting of glass fibers embedded in silicone rubber is interposed between the two frusto-conical parts to provide both a barrier to the passage of heat and a packing seal to ensure oil- and vacuum tightness.

The prior proposal, although it solves to a certain extent the problem of maintaining the insulating liquid at a relatively low temperature, has some disadvantages among which are those mentioned hereinafter. For one thing, the layer of heat-insulating material, constituted for the greatest part by silicone rubber, cannot be counted on to guarantee oil-tightness over an appreciable period of time. However, oil-tightness is necessary when sheathing liquid impregnated cables to maintain the cores of the cables completely isolated from the outside atmosphere. Silicone rubber is normally sufficiently resistant to oil, but when the oil reaches high temperatures, the rubber readily dissolves. Another dfficulty is that in the course of time the inability to ensure good oil-tightness between the insulating tube and the bore of the inner die member may give rise to circulation of impregnating oil in the space between the insulating tube and the inner die member and, consequently, cooling of the latter. Still another disadvantage arises from the fact that the heat insulating layer must perform the double task of acting as a packing for achieving oil-tightness and as a barrier against the passage of heat. This has the drawback that one of said functions can be improved only at the expense of the other. To obtain a good oil-tight seal it is necessary to compress said layer in an appropriate manner and, by doing so, the heat transfer between the inner die member and the insulating tube is increased. On the other hand, good thermal insulating material will provide an insufficient seal.

The present invention has for an object the provision of an extruder for sheathing cable cores impregnated with insulating liquids which is free from the above indicated disadvantages and which permits production of uniform sheaths having good mechanical characteristics.

In accordance with the present invention there is provided an extruder for sheathing cable cores comprising, in combination, an inner die having a through central bore, a metal tube concentrically disposed within said bore with one end substantially coterminous with the outlet end of said die, the outer diameter of said tube being smaller than the diameter of said bore to provide a space therebetween, the inner diameter of said tube being dimensioned for enabling the cable core to be fed therethrough, a layer of thermal insulation within said space extending from said outlet end of the die to a point within said bore, a packing element surrounding said tube within said bore at said point, said packing element being heat resistant, and means for resiliently compressing said packing element between said tube and said inner die for establishing an hermetic seal therebetween.

By keeping the means for establishing the hermetic seal separate from that for providing thermal insulation of the tube from the inner die member, the above indicated drawbacks are eliminated. This follows from the fact that the seal is provided by compressing only the packing element which is resistant to the impregnating liquid, and not the material of the layer of thermal insulation which remains in the optimum condition for carrying out its insulating function.

In a preferred embodiment of the invention the means for compressing the packing element comprises a first radial shoulder on the inner die at the point within the bore, said first shoulder facing the inlet end of the die, a second radial shoulder formed on the exterior of the tube facing said first shoulder, said packing element being ring shaped and disposed between the shoulders, and means for resiliently urging said tube relative to said die towards the outlet end thereof for compressing the packing element between said shoulders. The last mentioned means preferably comprises a second metal tube surrounding the first tube within the bore of the inner die with one end in engagement with a flange, the latter providing the second shoulder and being located on the exterior of the first tube intermediate the ends thereof. The second tube is urged resiliently against the flange by means of an externally threaded ring which is threadedly engaged with internal threads in the bore of the die near the inlet end thereof and disposed for compressing an annular spring member against a third shoulder formed on the exterior of the second tube within the bore of the die, the third shoulder facing away from that end of the second tube which engages the first mentioned flange.

Asbestos has proved to be a good thermal insulating material suitable for the purposes of the invention. The packing, which must be resistant to the impregnating liquid and to heat and must be thermally insulating, is preferably constituted by an annular body of asbestos interposed between two copper rings.

The invention will be better understood after reading the following detailed description of a presently preferred embodiment thereof with reference to the appended drawings in which:

FIGURE 1 is a diagrammatic representation of an arrangement of suitable equipment for sheathing cable cores impregnated with insulating oil; and FIGURE 2 is a longitudinal fragmentary half section of the details of an extruder according to the invention suitable for sheathing cores with aluminum.

In the drawings, to which attention is now directed, the same reference numerals are used throughout to designate the same or similar part.

Referring to FIGURE 1, there is shown a tank 10 in which the cores are dried under vacuum and are then impregnated with oil. The extruder for sheathing the cores with aluminum is designated 11. An oil and vacuum tight connection between the impregnation tank 10 and the extruder 11 is provided by the member 12. A cable core 13 is paid out from a reel or drum 14 supported in the tank 10 and is sheathed with aluminum without coming into contact with the air. A cooling tube or chamber is shown at 15 tightly connected to the outlet of the extruder 11 with the aid of appropriate gaskets 16 (best seen in FIGURE 2). The sheathed cable is collected on a suitable reel or drum 17 and is then subjected to any other necessary operation.

The cooling tube 15 is necessary to lower the temperature of the extruded sheath immediately after its leaving the extruder. In the absence of prompt cooling, the high temperature of the sheath could cause considerable damage to the core insulation.

The actual cooling operation is carried out by spraying the sheath with water. This may be effected under pressure, as described for instance in Italian Patent No. 684,129, or under vacuum as described in British Patent No. 908,036. Cooling under pressure is always necessary when sheaths of thermoplastic materials are extruded on cable cores that have been previously dried and impregnated with fluid oil. The sheath of thermoplastic material could break if the oil pressure in its interior were not appropriately balanced. Cooling under vacuum, on the other hand, is indispensable when cooling sheaths which have been extruded on cores that have been dried under vacuum in a suitable tank and the sheathing is performed with the core still under the same environmental conditions of drying and vacuum existing in the tank. In fact, in such case, an external pressure could cause the sheath to be squeezed or contracted on the cable core. In the example described herein, however, wherein the sheath is made of aluminum, cooling is carrid out at atmospheric pressure. The aluminum sheath can easily withstand the oil pressure existing on its interior without requiring any balancing external overpressure.

Referring, now, to FIGURE 2, there is shown at 18 a portion of the outer die or body of the extruder 11. The cooling tube 15 is connected to the member 18 by means of a threaded ring 19. The sealing gasket 16 is compressed therebetween, as shown. The extrusion duct 20 is formed between the body of the extruder and the inner die member 21.

The innr die member 21 has a through central bore through which passes the cable core to be sheathed. Within the bore of the inner die member 21 there is provided a metal tube 22 which is referred to herein as an insulating tube. During the sheathing operation the tube 22 is filled with oil coming from the impregnation tank, the oil partially penetrating the core.

The inner die member 21 has a through central bore temperature equal to or higher than the melting temperature of aluminum. Therefore, the oil inside the tube 22, if the latter were in thermal contact with the inner die member 21, would tend to get hot and to flow towards the upper part of the tube (as viewed in the drawing), while cool oil coming from the tank 10 would tend to flow towards the lower part of said tube. In order to avoid the possibility that the difference in oil temperature of the sheath, it is necessary to interpose thermal give rise to analogous differences in temperature between the lower and upper parts of the aluminum sheath and consequently to metal creep capable of causing rupture of the sheath, it is necessary to interpose thermal insulation between the inner die member 21 and the tube 22. Such insulation, shown at 23, can be obtained by winding or wrapping around the tube 22 a layer of asbestos threads. This enables the temperature of the tube 22 and consequently the temperature of the oil to be maintained relatively low. As a result, the oil will experience a reduced upward convection movement and will have a uniform temperature throughout the entire opening or outlet of the extruder. Thus, the cooling action exerted by the oil on the aluminum occurs in a uniform manner over the entire cross-section of the extruded sheath and, consequently, no creep defects occur between the upper and the lower parts.

The tube 22 at an intermediate point is provided with an annular flange 24, and the inner die member 21 is provided with a corresponding enlargement 25 which creates a step or shoulder 26. A packing element 27 is interposed and compressed between the shoulder 26 and the flange 24 in order to prevent circulation of oil in the space between the tube 22 and the inner die member 21 which could cause the cooling of the latter.

The packing 27, constituted by an annular asbestos body interposed between two copper rings, is compressed between the flange 24 and the shoulder 26 by virtue of the action of appropriate thrust means constituted by a second tube 28, slidably disposed on the tube 22. A layer 29 of thermal insulating material, preferably asbestos cloth, is interposed between tube 22 and tube 28. Thrust is imparted to tube 28 by springs 30 acting on a flange 31 with which the tube 28 is provided in order to push the latter axially against the flange 24 of the tube 22. The springs 30 are kept in position around the tube 28 under the action of a threaded ring 32, which is screwed inside the inner die member. The rear or inlet portion of the bore of the inner die 21 has a further enlargement 33 to accommodate the springs 30 and the threaded ring 32.

By acting on the ring 32, namely, by screwing it more or less into the inner die member 21, it is possible to vary the compression force of the springs 30, and thereby the axial thrust on the tube 28 and consequently the compression of the packing 27. In this way it is possible to control and eliminate any oil passage between the tube 22 and the inner die member 21.

The fact that the packing is constituted by an asbestos body interposed between two copper rings and that the elastic function of the packing, necessary to accommodate variations in the mechanical stresses due to thermal variations, is developed by separate means, i.e., the springs 30, enables the packing to be subjected to a compressive force sufficient to prevent any oil passage under any and all service conditions. At the same time, the packing is free from all the typical failures of a packing constituted by elastomeric material.

The foregoing description illustrates a particular embodiment of the invention; it is, however, to be understood that numerous changes may be made therein, as will occur to those skilled in the art, without departing from the true spirit of the invention as defined in the appended claims. For example, the extruder forming the object of the invention can be used for sheathing cable cores dried under vacuum in an appropriate tank and sheathed in the same environmental conditions of drying and vacuum existing in the tank. In this case it is, in fact, necessary to ensure vacuum tightness within the inner die member.

Finally, it is to be understood that the invention concerns any type of sheath made of metal or of thermoplastic material which is suitable for covering cable cores impregnated with insulating liquid.

What is claimed is:

1. An extruder for sheathing cable cores comprising, in combination, an inner die having a through central bore, a metal tube concentrically disposed within said bore with one end substantially coterminous with the outlet end of said die, the outer diameter of said tube being smaller than the diameter of said bore to provide a space therebetween, the inner diameter of said tube being dimensioned for enabling the cable core to be fed therethrough, a layer of thermal insulation within said space extending from said outlet end of the die to a point within said bore, a packing element surrounding said tube within said bore at said point, said packing element being heat resistant, and means for resiliently compressing said packing element between said tube and said inner die for establishing an hermetic seal therebetween.

2. An extruder according to claim 1, wherein the means for compressing said packing element comprises a first radial shoulder on said inner die at said point within the bore, said first shoulder facing the inlet end of the die, a second radial shoulder formed on the exterior of said tube facing said first shoulder, said packing element being ring shaped and disposed between said shoulders, and means for resiliently urging said tube relative to said die towards the outlet end thereof for compressing said packing element between said shoulders.

3. An extruder according to claim 2, wherein said second shoulder is constituted by one of the radial faces of a flange on the exterior of said tube intermediate the ends thereof, and the means for resiliently urging the tube comprises a second metal tube surrounding said first tube within said bore and with one end in engagement with the other radial face of said flange, and means for urging said second tube resiliently against said flange.

4. An extruder according to claim 3, wherein the means for urging said second tube comprises a third shoulder formed on the exterior of said second tube within said bore and facing away from said one end of the second tube, an annular spring member, and an externally threaded ring, said ring being threadedly engaged with internal threads in said bore near the inlet end thereof and disposed for compressing said spring member against said third shoulder.

5. An extruder according to claim 4, wherein said packing element comprises an asbestos ring sandwiched between a pair of metallic rings.

6. An extruder according to claim 5, wherein said metallic rings consist essentially of copper.

7. An extruder according to claim 6, wherein a layer of thermal insulation is interposed between said first and second tubes.

References Cited

UNITED STATES PATENTS

| | | | |
|---|---|---|---|
| 2,427,930 | 9/1947 | Sittner | 18—13 |
| 3,104,421 | 9/1963 | Park | 18—13 |
| 3,225,385 | 12/1965 | Keine | 18—13 |
| 3,239,884 | 3/1966 | Seidel et al. | 18—13 |

FOREIGN PATENTS

| | | |
|---|---|---|
| 952,095 | 3/1964 | Great Britain. |
| 1,079,551 | 8/1967 | Great Britain. |

WILLIAM J. STEPHENSON, Primary Examiner